(12) United States Patent
St-Yves

(10) Patent No.: US 9,403,434 B2
(45) Date of Patent: Aug. 2, 2016

(54) HYDRAULIC SYSTEM FOR EXTREME CLIMATES

(71) Applicant: POSI-PLUS TECHNOLOGIES INC., Victoriaville (CA)

(72) Inventor: Jean-Francois St-Yves, Trois-Rivieres (CA)

(73) Assignee: POSI-PLUS TECHNOLOGIES INC., Victoriaville (CA)

( * ) Notice: Subject to any disclaimer, the term of this patent is extended or adjusted under 35 U.S.C. 154(b) by 17 days.

(21) Appl. No.: 14/600,521

(22) Filed: Jan. 20, 2015

(65) Prior Publication Data

US 2015/0204358 A1    Jul. 23, 2015

Related U.S. Application Data

(60) Provisional application No. 61/929,304, filed on Jan. 20, 2014.

(51) Int. Cl.
*B60K 25/00* (2006.01)
*F15B 21/04* (2006.01)
*F16H 61/40* (2010.01)
*F15B 13/04* (2006.01)

(52) U.S. Cl.
CPC .............. *B60K 25/00* (2013.01); *F15B 21/042* (2013.01); *F16H 61/40* (2013.01); *F15B 2013/0413* (2013.01); *F15B 2211/20546* (2013.01); *F15B 2211/3105* (2013.01); *F15B 2211/3111* (2013.01); *F15B 2211/3116* (2013.01); *F15B 2211/327* (2013.01); *F15B 2211/6343* (2013.01); *F15B 2211/6654* (2013.01)

(58) Field of Classification Search
CPC ................ B60K 25/00; F16B 21/042; F15B 2211/3116; F15B 2211/6343; F15B 2211/6654; F15B 2211/3111; F16H 61/40
See application file for complete search history.

(56) References Cited

U.S. PATENT DOCUMENTS

| | | | |
|---|---|---|---|
| 3,882,883 | A | 5/1975 | Droegemueller |
| 3,952,509 | A | 4/1976 | Coleman |
| 4,129,986 | A | 12/1978 | Heinrich |
| 4,471,703 | A | 9/1984 | Vatsky et al. |
| 4,531,707 | A | 7/1985 | Dotti et al. |
| 5,419,129 | A | 5/1995 | Becker et al. |
| 5,546,750 | A | 8/1996 | Richer |
| 5,873,244 | A | 2/1999 | Cobo et al. |

(Continued)

FOREIGN PATENT DOCUMENTS

| | | |
|---|---|---|
| CA | 2161619 A1 | 3/1996 |
| JP | 10-274212 A | 10/1998 |
| JP | 2008-267490 A | 11/2008 |

*Primary Examiner* — Faye M Fleming
(74) *Attorney, Agent, or Firm* — Hugh Mansfield

(57) ABSTRACT

A method of operating a hydraulic system and hydraulic system for raising and lowering a boom in extreme climates. When the temperature is below a low temperature the system is operated open center while a variable displacement pump providing a constant flow of hydraulic fluid. When the temperature is between the low temperature and a moderate temperature the variable displacement pump provides at least a minimum flow of hydraulic fluid to the system, and the minimum flow decreases linearly with an increase of the temperature. When the temperature is above the moderate temperature, the system is operated closed center while maintaining at least a system pressure when in neutral and wherein the variable displacement pump provides hydraulic fluid to the actuator when a control valve is actuated.

17 Claims, 6 Drawing Sheets

(56) References Cited

U.S. PATENT DOCUMENTS

| | | |
|---|---|---|
| 2005/0016375 A1 | 1/2005 | Harwath et al. |
| 2007/0295005 A1 | 12/2007 | Fleishmann |
| 2009/0071145 A1 | 3/2009 | Kim |
| 2010/0096576 A1* | 4/2010 | Sommer ............... B60T 11/30 251/129.15 |
| 2010/0139611 A1 | 6/2010 | Hunter |
| 2011/0020146 A1 | 1/2011 | Akiyama et al. |
| 2011/0030363 A1 | 2/2011 | Lech et al. |
| 2012/0198832 A1 | 8/2012 | Fukumoto |
| 2013/0000293 A1 | 1/2013 | Dybing |
| 2013/0015254 A1 | 1/2013 | Xie et al. |
| 2013/0133972 A1 | 5/2013 | Elliott |
| 2013/0220425 A1 | 8/2013 | Pomeroy et al. |
| 2014/0305723 A1* | 10/2014 | Sherlock ............... F01P 11/10 180/68.2 |
| 2015/0204358 A1* | 7/2015 | St-Yves ............... B60K 25/00 180/53.4 |
| 2015/0275468 A1* | 10/2015 | Horii ............... E02F 3/425 60/428 |
| 2015/0300378 A1* | 10/2015 | Udagawa ............... E02F 3/32 60/449 |
| 2015/0308469 A1* | 10/2015 | Beschorner ............ F15B 19/00 60/327 |

* cited by examiner

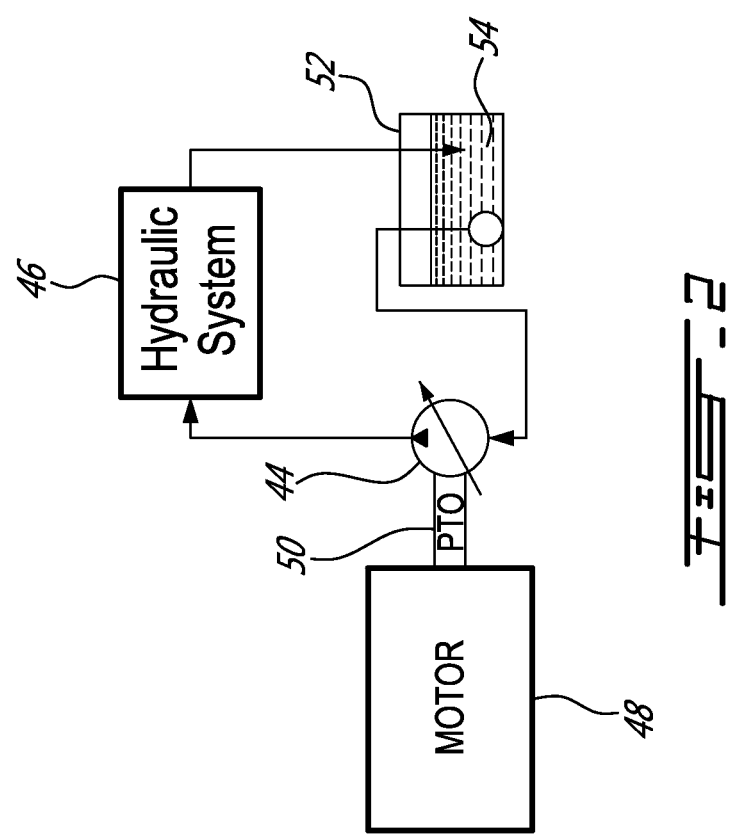

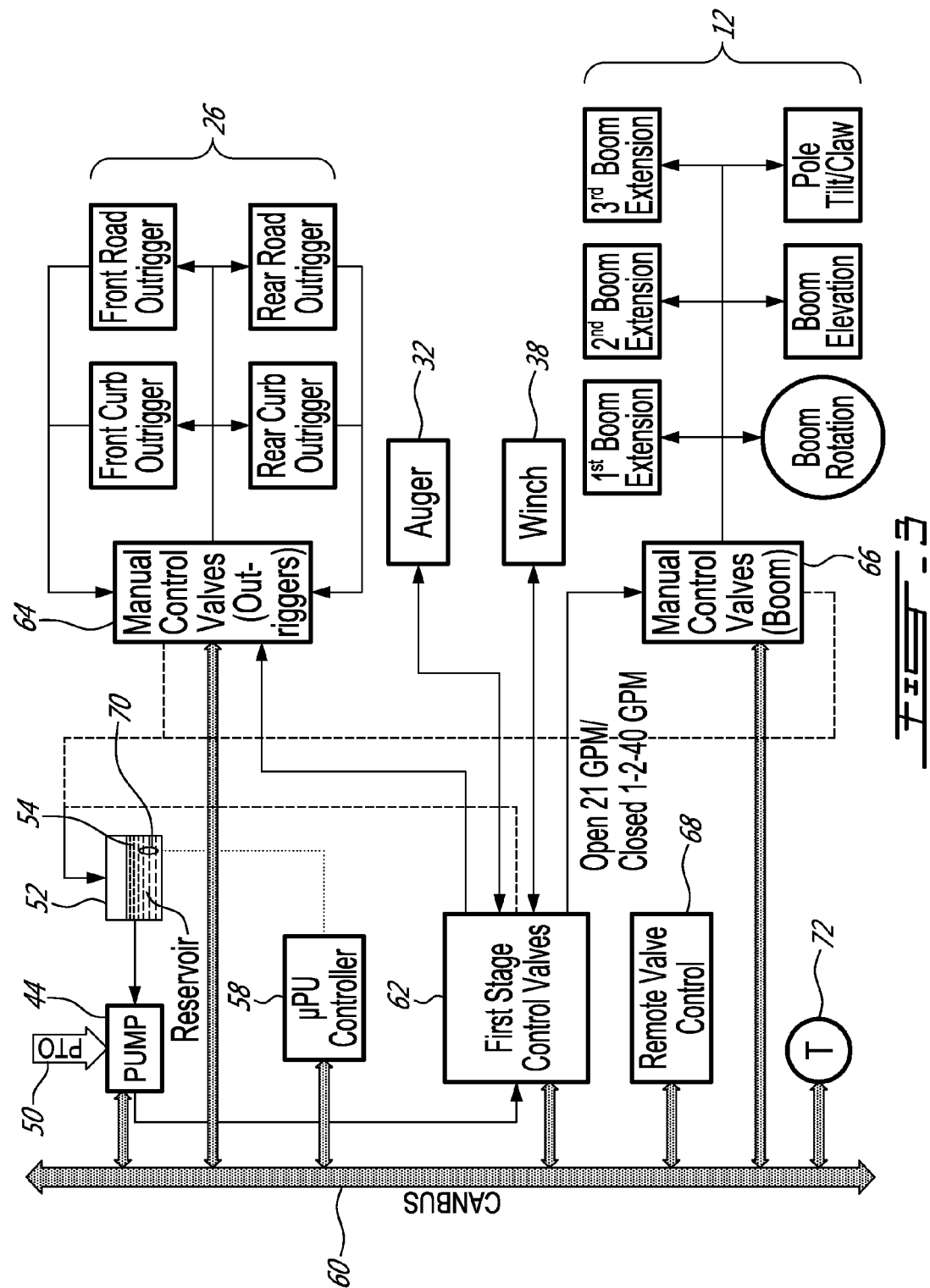

HYDRAULIC SYSTEM FOR EXTREME CLIMATES

CROSS REFERENCE TO RELATED APPLICATIONS

This application claims benefit under 35 U.S.C. §119(e), of U.S. provisional application Ser. No. 61/929,304, filed on Jan. 20, 2014. This document is incorporated herein in its entirety by reference.

FIELD OF THE INVENTION

The present invention relates to a hydraulic system for extreme climates. In particular, the present invention relates to a hydraulic system for actuating the boom on a utility truck which operates as open center, variable flow open center or closed center depending on the temperature of operation.

BACKGROUND OF THE INVENTION

The prior art reveals hydraulic systems which operate open center and closed center depending on the type of application. As they do not require variable displacement pumps and the requisite feedback pump control, open center systems are somewhat simpler to implement but have the drawback of being inefficient. Closed center systems are typically less responsive and more efficient, especially in systems that carry out intermittent tasks such as raising and lowering the boom of crane or the like. However, in extremely cold climates the hydraulic fluid within a closed center system that is run intermittently is circulated only intermittently and therefore remains cold, which reduces the system responsiveness.

SUMMARY OF THE INVENTION

In order to address the above and other drawbacks, there is provided a method of operating a hydraulic system for raising and lowering a boom and comprising a variable displacement pump, a hydraulic fluid having a temperature and at least one actuating assembly comprising and actuator operated by a control valve. The method comprises, when the fluid temperature is below a low temperature, operating the control valve open center while the variable displacement pump provides a constant flow of hydraulic fluid to the control valve, when the fluid temperature is between said low temperature and a moderate temperature above said low temperature, operating the control valve open center while the variable displacement pump provides at least a minimum flow of hydraulic fluid to the control valve, wherein the minimum flow decreases preferably linearly with an increase of the fluid temperature and when the fluid temperature is said moderate temperature, operating the control valve closed center while maintaining at least a system pressure at the control valve when in neutral and wherein the variable displacement pump provides hydraulic fluid to the actuator when the control valve is actuated.

There is also disclosed a hydraulic system comprising at least one actuator, a control valve, a hydraulic fluid having a temperature, a reservoir for holding at least some of the hydraulic fluid, a thermostat for detecting a temperature of the hydraulic fluid, and a variable displacement pump for circulating the hydraulic fluid to the actuator under control of the control valve. When the fluid temperature is below a low temperature, the control valve is operated open center while the variable displacement pump provides a constant flow of hydraulic fluid to the control valve, wherein when the fluid temperature is between the low temperature and a moderate temperature above the low temperature, the control valve is operated open center and the variable displacement pump provides at least a minimum flow of hydraulic fluid to the control valve and the minimum flow decreases with an increase of the fluid temperature, and wherein when the fluid temperature is above the moderate temperature, the control valve is operated closed center while maintaining at least a system pressure at the control valve when in neutral and wherein the variable speed pump provides hydraulic fluid to the actuator when the control valve is actuated.

Additionally, there is disclosed a utility truck for operation in extreme climates and comprising a chassis. The truck further comprises a boom mounted on the chassis, at least one actuator for raising and lowering the boom, a control valve, a hydraulic fluid having a temperature, a thermostat for detecting a temperature of the hydraulic fluid, and a variable speed pump for circulating the hydraulic fluid to the actuator under control of the control valve. When the fluid temperature is below a low temperature, the control valve is operated open center while the variable speed pump provides a constant flow of hydraulic fluid to the control valve, wherein when the fluid temperature is between the low temperature and a moderate temperature above the low temperature, the control valve is operated open center and the variable speed pump provides at least a minimum flow of hydraulic fluid to the control valve and the minimum flow decreases with an increase of the fluid temperature, and wherein when the fluid temperature is above the moderate temperature, the control valve is operated closed center while maintaining at least a system pressure at the control valve when in neutral and wherein the variable speed pump provides hydraulic fluid to the actuator when the control valve is actuated.

BRIEF DESCRIPTION OF THE DRAWINGS

FIG. 2 is an over view block diagram of a hydraulic system in accordance with an illustrative embodiment of the present invention;

FIG. 3 is a detailed schematic block diagram of a hydraulic system in accordance with an illustrative embodiment of the present invention;

DETAILED DESCRIPTION OF THE ILLUSTRATIVE EMBODIMENTS

Figure 1:
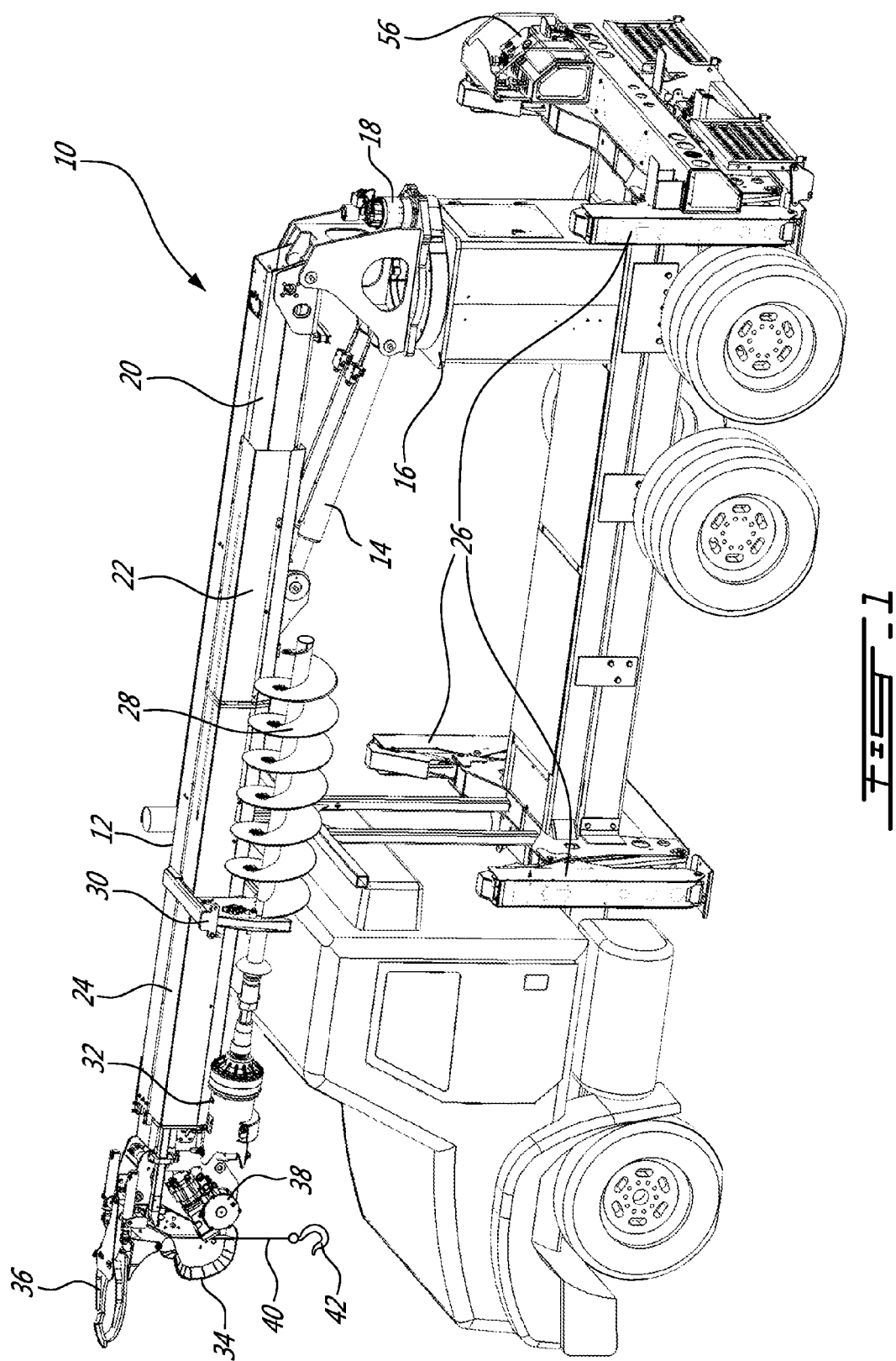
FIG. 1 is a raised rear perspective view of a utility truck in accordance with an illustrative embodiment of the present invention.

Now referring to FIG. 1, a utility truck, generally referred to using the reference numeral 10, will now be described. Illustratively, the utility truck 10 is equipped with a multiple of hydraulically powered devices which are used to set utility poles into the ground. A boom/crane 12 is provided which can be raised and lowered though action of one or more pistons 14, and rotated around a table 16 through actuation of a hydraulic motor 18. The boom 12 is comprised of one or more telescoping segments 20, 22, 24 which are arranged for sliding relative to one another and under control of a plurality of hydraulic pistons (not shown). In order to stabilize the utility truck 10 during raising, rotating and extending the boom 12, opposed pairs of hydraulically actuated outriggers as in 26 are provided. An auger 28, illustratively shown in a stored position for travel where the auger 28 is secured against the boom 12 by a releasable locking support 30, and driven by a hydraulic motor 32, is provided for excavating holes into which a utility pole (not shown) can be placed. A pole tilt 34 comprising a pair of opposed hydraulically actuated pole grasping jaws 36 is provided for grabbing and manipulating the utility pole. In order to draw the utility pole into the jaws, for example, a hydraulic winch 38 and associated cable 40, illustratively terminated by a hook 42, is also provided.

Referring now to FIG. 2 in addition to FIG. 1, power for driving the pump(s) 44 which drive the hydraulic system(s) 46 are provided by the utility truck motor 48 via a power take off (PTO) 50. As will be discussed in more detail below, depending on the temperature of operation, the pump 44 in cooperation with flow and pressure sensing control valves provides hydraulic fluid to the hydraulic system 46 at either a constant flow rate (open center), measured as Gallons per Minute (GPM), or at a variable flow rate while maintaining at least a minimum system pressure (closed center). A tank 52 is also provided as reservoir for hydraulic fluid 54. An operator can control the elements of the hydraulic system 46 via a control panel 56 located towards the year of the utility truck 10.

Referring now to FIG. 3, the hydraulic system is controlled by a controller 58 which communicates with the various components of the hydraulic system via a standardized communications bus 60 such as CANBUS or the like. The hydraulic system comprises a series of electronically flow and pressure controllable first stage control valves 62. The first stage control valves 62 are able to controllably supply a high flow of hydraulic fluid to the manual control valves 64, 66 which form part of the control panel 56 and operate respectively the stabilizing outriggers 26 or the boom 12, or other hydraulic subsystems, such as the auger motor 32 or the winch 38. Remote valve control 68 can also be provided for some or all of the hydraulic subsystems. A thermostat 70 is also provided for measuring the temperature of the system, and which is for example positioned within the hydraulic fluid 54 held within the tank 52. In a particular embodiment a thermostat 72 may also be located elsewhere within the utility truck 10, or a plurality of thermostats 72, may be provided at strategic points within the sysem.

For systems which require intermittent but quick supply of hydraulic power (such as a boom or the like) open center systems which continually pump hydraulic fluid at a constant rate throughout the hydraulic system are relatively inefficient when compared to closed centered systems which adjust flow rate in response to changes in requests for hydraulic power. On the other hand, at lower hydraulic fluid temperatures (below about 5° C.), and due to increased viscosity of the hydraulic fluid, closed center systems can be undesirably unresponsive.

Figure 4A:
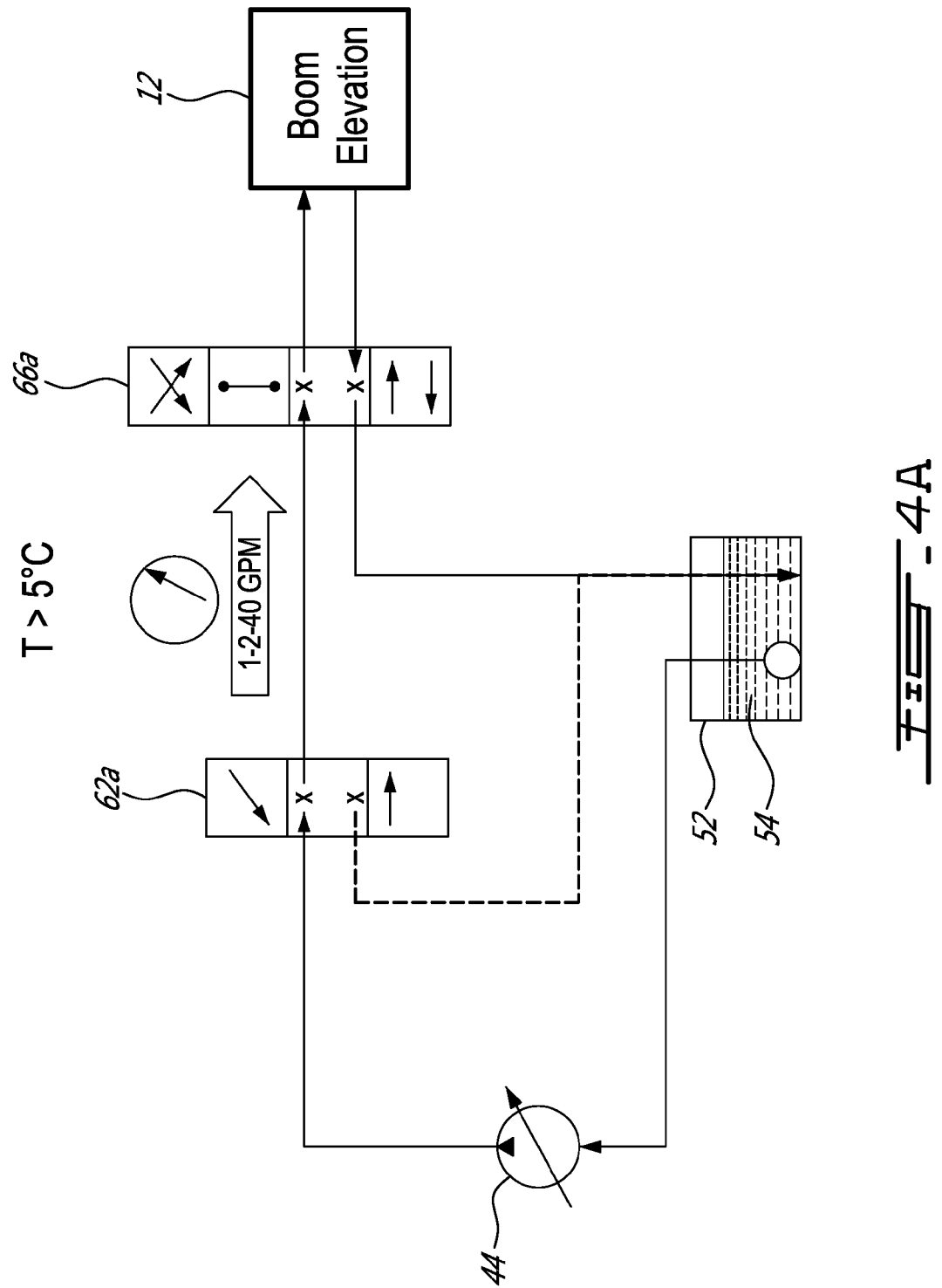
FIG. 4A is a block diagram of a hydraulic system operating at warm temperatures and in accordance with an illustrative embodiment of the present invention.

Referring now to FIG. 4A, as a result, at higher oil temperatures (for example above about 5° C.) as the hydraulic fluid exhibits normal viscosity and optimal flow characteristics, in a first mode of operation all subsystems of the hydraulic system operate as closed center systems wherein the displacement of the pump 44, and therefore the flow of hydraulic fluid through the system, is adjusted in response to a call by one or other of the hydraulic control valves as in 66a illustratively at a rate of between 1-2 GPM and about 40 GPM.

Figure 4B:
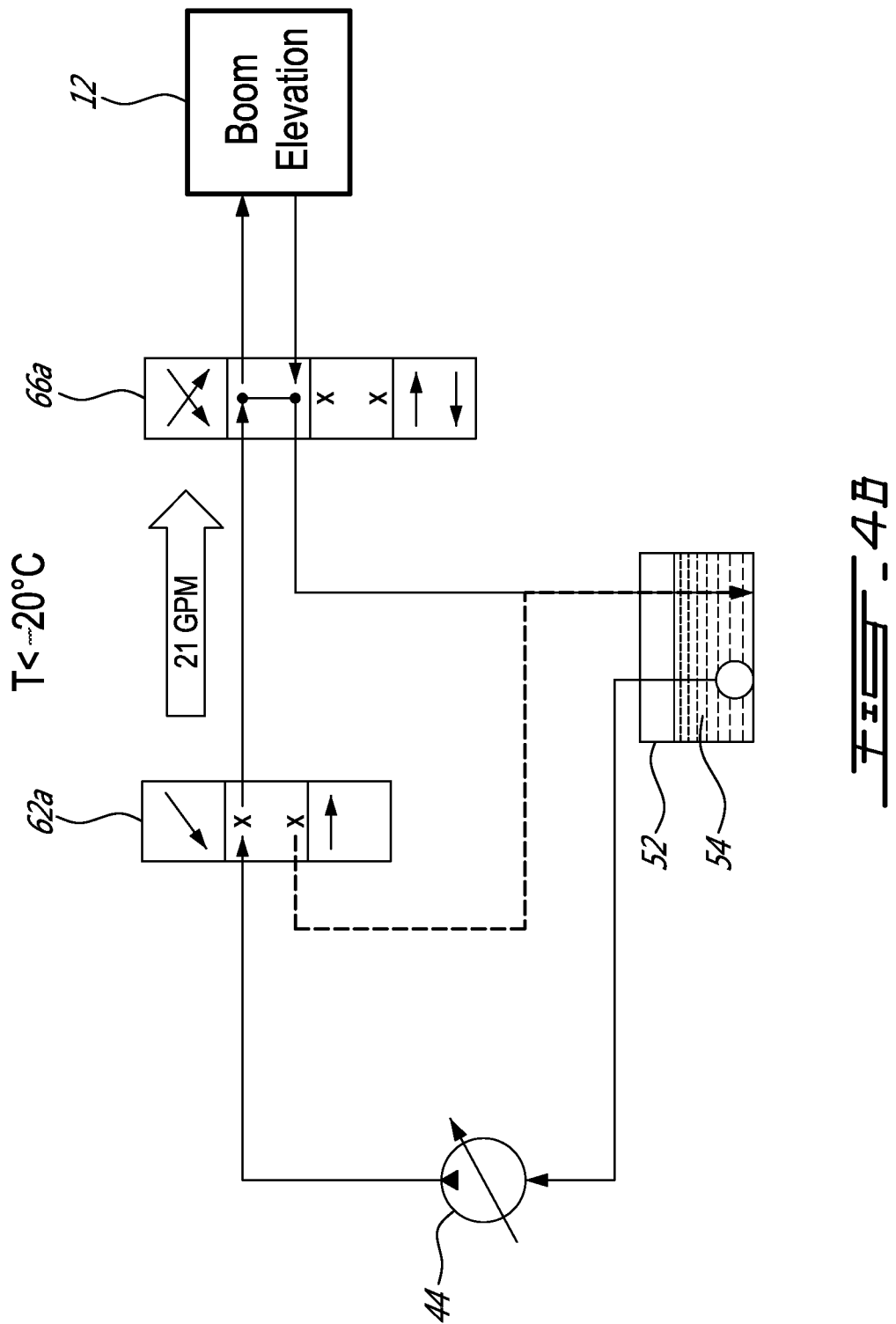
FIG. 4B is a block diagram of a hydraulic system operating at cold temperatures and in accordance with an illustrative embodiment of the present invention.

Referring of FIG. 4B, at colder temperatures below about −20° C. and in a second mode of operation, some hydraulic subsystems (in particular the hydraulic subsystems which required responsive intermittent power such as that which operates the boom 12) operate as open center systems wherein hydraulic fluid is circulated through the hydraulic subsystem at a constant rate (illustratively at a rate of about 21 GPM). Note that the rate is somewhat below the maximum to ensure that adverse effects due to increased viscosity or the like do not occur in the hydraulic fluid and associated components. This allows the hydraulic fluid 54 as well as the components being supplied by the hydraulic subsystem(s) operating as open center systems to be warmed, thereby improving their overall performance and responsiveness.

Figure 4C:
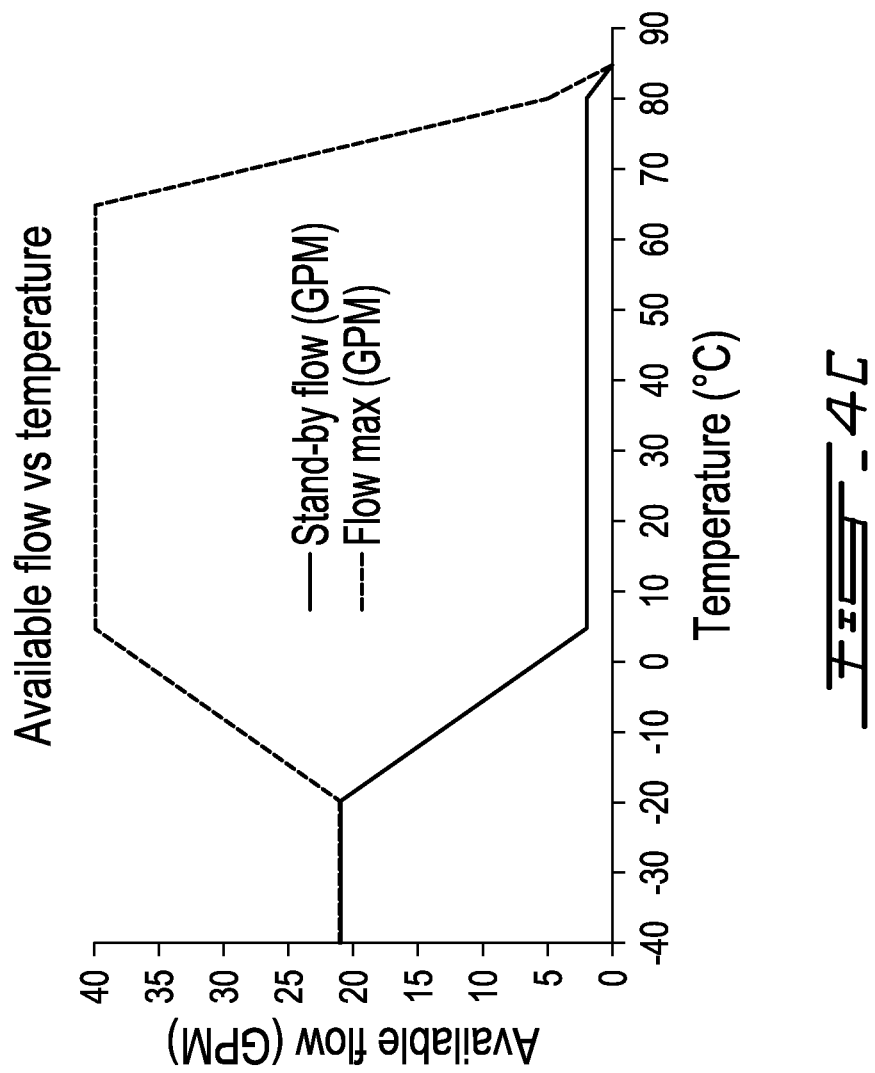
FIG. 4C is a chart of available flow versus temperature in accordance with an illustrative embodiment of the present invention.

Referring to the chart of FIG. 4C, between temperatures of −20° C. and 5° C. the hydraulic systems operating as alternatively open center and closed center hydraulic systems are operated as hybrid systems, where a temperature dependent minimum flow of hydraulic fluid is maintained through the control valves to ensure a reduced yet continued warming effect. Additionally, in response to calls for hydraulic power from one or other of the control valves, the rate of flow is increased.

Referring back to FIG. 3, for the remaining hydraulic systems which are operated solely as closed center systems, such as the winch 38 and the auger 32, these typically do not require the same responsiveness as the boom and also are typically operated for extended periods of time, which allows the hydraulic fluid within these closed center subsystems to reach suitable operating temperatures even when extremely cold. As a result, the winch 38 and auger 32 are operated as closed center.

Although the present invention has been described hereinabove by way of specific embodiments thereof, it can be modified, without departing from the spirit and nature of the subject invention defined in the appended claims.

I claim:

1. A method of operating a hydraulic system and comprising a variable displacement pump, a hydraulic fluid having a temperature and at least one actuating assembly comprising an actuator operated by a control valve, the method comprising:
    when the fluid temperature is below a low temperature, operating the control valve open center while the variable displacement pump provides a constant flow of hydraulic fluid to the control valve;
    when the fluid temperature is between said low temperature and a moderate temperature above said low temperature, operating the control valve open center while the variable displacement pump provides at least a minimum flow of hydraulic fluid to the control valve, wherein said minimum flow decreases with an increase of the fluid temperature; and
    when the fluid temperature is above said moderate temperature, operating the control valve closed center while maintaining at least a system pressure at the control valve when in neutral and wherein the variable displacement pump provides hydraulic fluid to the actuator when the control valve is actuated.

2. The method of claim 1, wherein said low temperature is about −20° C.

3. The method of claim 1, wherein said constant flow is about 21 GPM.

4. The method of claim 1, wherein said moderate temperature is about 5° C.

5. The method of claim 1, wherein said minimum flow decreases linearly with an increase of the fluid temperature.

6. The method of claim 5, wherein said minimum flow decreases between a maximum of 21 GPM and a minimum of 1 GPM.

7. The method of claim 5, wherein the variable displacement pump provides between 1 and 40 GPM of hydraulic fluid to the actuator.

8. A hydraulic system comprising:
   at least one actuator;
   a control valve;
   a hydraulic fluid having a temperature;
   a reservoir for holding at least some of said hydraulic fluid;
   a thermostat for detecting a temperature of said hydraulic fluid; and
   a variable displacement pump for circulating said hydraulic fluid to said actuator under control of said control valve;
   wherein when said fluid temperature is below a low temperature, said control valve is operated open center while said variable displacement pump provides a constant flow of hydraulic fluid to the control valve, wherein when said fluid temperature is between said low temperature and a moderate temperature above said low temperature, said control valve is operated open center and said variable displacement pump provides at least a minimum flow of hydraulic fluid to said control valve and said minimum flow decreases with an increase of the fluid temperature, and wherein when said fluid temperature is above said moderate temperature, said control valve is operated closed center while maintaining at least a system pressure at said control valve when in neutral and wherein the variable speed pump provides hydraulic fluid to the actuator when the control valve is actuated.

9. The hydraulic system of claim 8, further comprising a boom and wherein said at least one actuator is actuated to selectively raise and lower said boom.

10. The hydraulic system of claim 8, wherein said low temperature is about −20° C.

11. The hydraulic system of claim 8, wherein said constant flow is about 21 GPM.

12. The hydraulic system of claim 8, wherein said moderate temperature is about 5° C.

13. The hydraulic system of claim 8, wherein said minimum flow decreases linearly with an increase of said fluid temperature.

14. The hydraulic system of claim 13, wherein said minimum flow decreases between a maximum of 21 GPM and a minimum of 1 GPM.

15. The hydraulic system of claim 13, wherein said variable speed pump provides between 1 and 40 GPM of said hydraulic fluid to said actuator.

16. A utility truck for operation in extreme climates and comprising a chassis, the truck further comprising:
   a boom mounted on the chassis;
   at least one actuator for raising and lowering said boom;
   a control valve;
   a hydraulic fluid having a temperature;
   a thermostat for detecting a temperature of said hydraulic fluid; and
   a variable speed pump for circulating said hydraulic fluid to said actuator under control of said control valve;
   wherein when said fluid temperature is below a low temperature, said control valve is operated open center while said variable speed pump provides a constant flow of hydraulic fluid to the control valve, wherein when said fluid temperature is between said low temperature and a moderate temperature above said low temperature, said control valve is operated open center and said variable speed pump provides at least a minimum flow of hydraulic fluid to said control valve and said minimum flow decreases with an increase of the fluid temperature, and wherein when said fluid temperature is above said moderate temperature, said control valve is operated closed center while maintaining at least a system pressure at said control valve when in neutral and wherein the variable speed pump provides hydraulic fluid to the actuator when the control valve is actuated.

17. The utility truck of claim 16, further comprising a power take off (PTO) and wherein said variable speed pump is driven by said PTO.

* * * * *